US011623364B2

(12) United States Patent
Schütt

(10) Patent No.: US 11,623,364 B2
(45) Date of Patent: Apr. 11, 2023

(54) DEVICE FOR COLLECTING SPLIT WOOD

(71) Applicant: Andreas Schütt, Neuhausen (DE)

(72) Inventor: Andreas Schütt, Neuhausen (DE)

( * ) Notice: Subject to any disclaimer, the term of this patent is extended or adjusted under 35 U.S.C. 154(b) by 521 days.

(21) Appl. No.: 16/585,262

(22) Filed: Sep. 27, 2019

(65) Prior Publication Data

US 2020/0023547 A1  Jan. 23, 2020

Related U.S. Application Data

(63) Continuation of application No. PCT/EP2018/057491, filed on Mar. 23, 2018.

(30) Foreign Application Priority Data

Mar. 29, 2017 (DE) ................ 20 2017 101 806.7

(51) Int. Cl.
*B23Q 3/00* (2006.01)
*B65D 61/00* (2006.01)
(Continued)

(52) U.S. Cl.
CPC .............. *B27L 7/08* (2013.01); *B23Q 3/00* (2013.01); *B65D 7/04* (2013.01); *B65D 61/00* (2013.01)

(58) Field of Classification Search
CPC .... B27L 7/00; B27L 7/005; B27L 7/06; B27L 7/08; B29C 45/1676; A47J 47/005; A47J 47/20; B65D 21/0233; B65D 7/04; B65D 61/00; B65D 21/02; B65D 21/064; B65D 21/066; B65D 21/068; B65D 7/00;
(Continued)

(56) References Cited

U.S. PATENT DOCUMENTS 4,763,695 A * 8/1988 Dooley ................ F16L 21/005
  285/236
6,094,859 A * 8/2000 Kalman ............. A47G 33/1213
  248/416
(Continued)

FOREIGN PATENT DOCUMENTS

CZ   6499 U1 *  4/1997  ............... B27L 7/08
CZ   6499 U1    11/1997
(Continued)

OTHER PUBLICATIONS

Machine Translation for CZ6449 via ESPACENET (Year: 2022).*
Machine Translation for DE 3202062 via ESPACENET (Year: 2022).*
(Continued)

*Primary Examiner* — Orlando E Aviles
*Assistant Examiner* — Sidney D Hohl
(74) *Attorney, Agent, or Firm* — Harness, Dickey & Pierce, P.L.C.

(57) ABSTRACT

A device for collecting split wood, having a plurality of bar elements, which each have a first and a second longitudinal portion, and a plurality of connecting elements, which connect the bar elements movably to one another. The second longitudinal portion of each bar element extends in a curved manner and the first longitudinal portion extends in a straight manner. The connecting elements cooperate with the second longitudinal portions, and a clamping element, which cooperates with the first longitudinal portions, is designed to firmly clamp the bar elements to a chopping block by their first longitudinal portions.

20 Claims, 3 Drawing Sheets

(51) Int. Cl.
  *B27L 7/08* (2006.01)
  *B65D 8/00* (2006.01)

(58) Field of Classification Search
  CPC .............. B65D 7/14; B65D 7/18; B65D 7/20;
       B65D 7/28; B23Q 3/00; B23Q 3/02;
       B67C 11/02; B27G 21/00; B26D 1/02;
       B26D 3/30; B26D 7/22
  USPC ........................................................ 144/195.6
  See application file for complete search history.

(56) References Cited

U.S. PATENT DOCUMENTS

| | | | |
|---|---|---|---|
| 2017/0050335 A1* | 2/2017 | Vänttilä | ............... B27L 7/08 |
| 2017/0080596 A1 | 3/2017 | Fetter | |

FOREIGN PATENT DOCUMENTS

| | | | | |
|---|---|---|---|---|
| DE | 3202062 A | * | 8/1983 | ............... B27L 7/08 |
| DE | 3202062 A1 | | 8/1983 | |
| DE | 202004011826 U1 | | 11/2004 | |
| DE | 202008008617 U1 | | 9/2008 | |
| DE | 202008008617 U1 | * | 10/2008 | ............... B27L 7/00 |
| DE | 202009004211 U1 | | 9/2009 | |
| DE | 202009004211 U1 | * | 10/2009 | ............... B27L 7/08 |
| EP | 2942168 A1 | | 11/2015 | |

OTHER PUBLICATIONS

Machine Translation for DE 202008008617 via ESPACENET (Year: 2022).*
Machine Translation for DE 2009004211 via ESPACENET (Year: 2022).*
International Search Report for PCT/EP2018/057491; dated May 16, 2018; 3 pp.

* cited by examiner

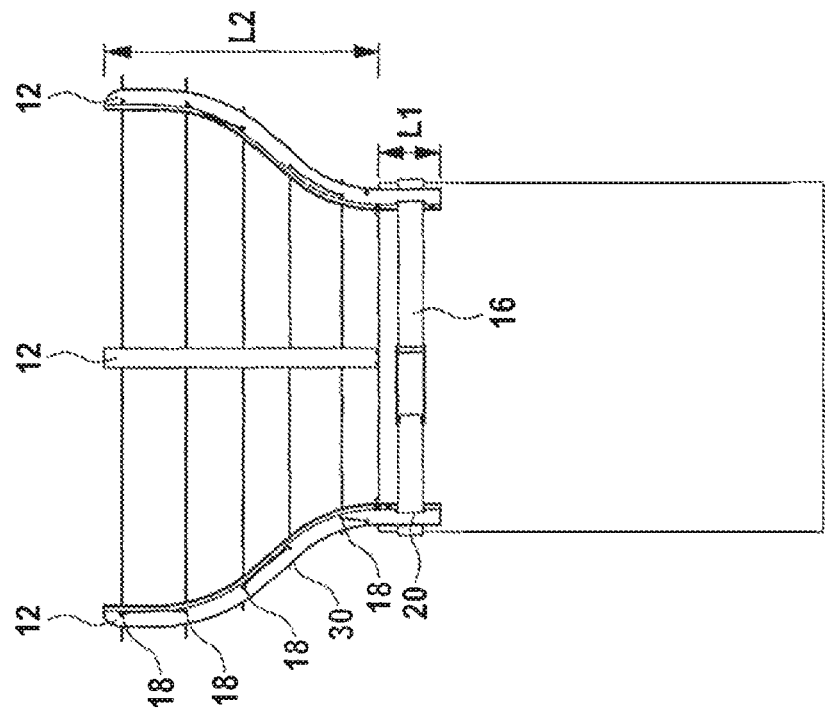
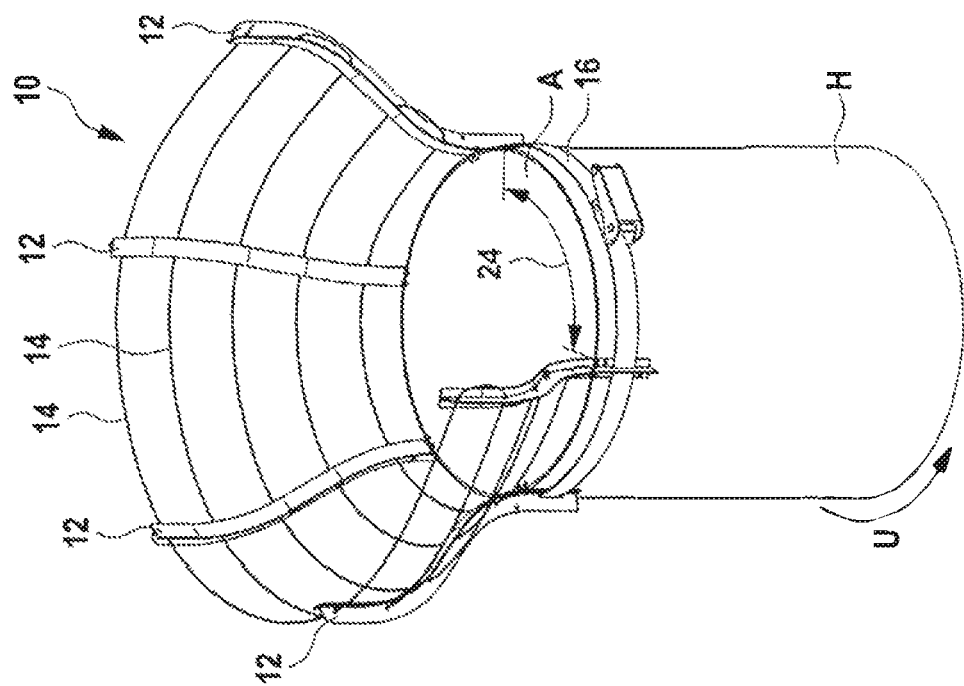

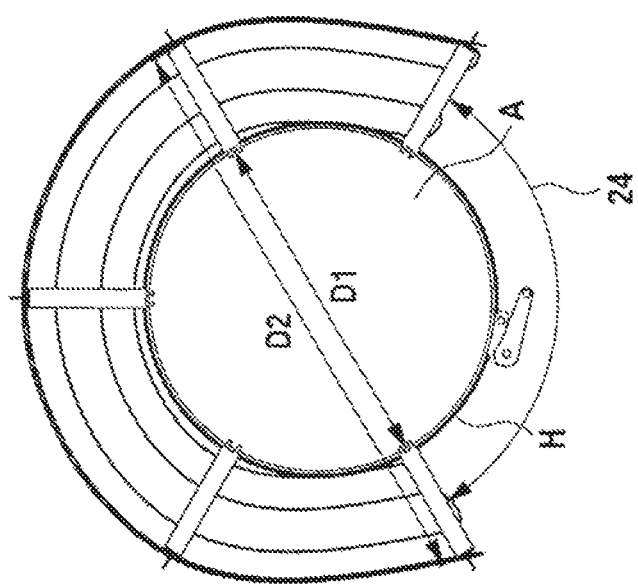
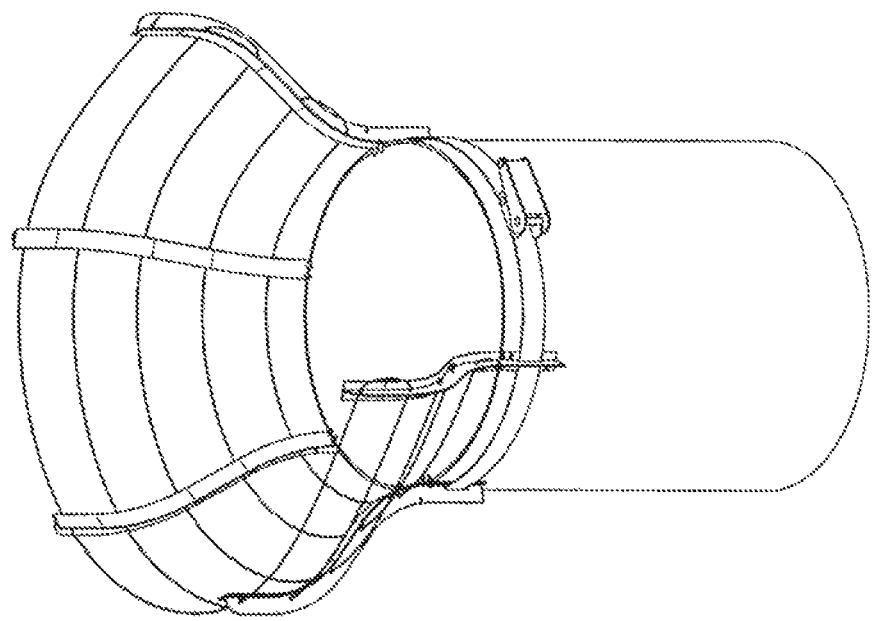
Fig. 3

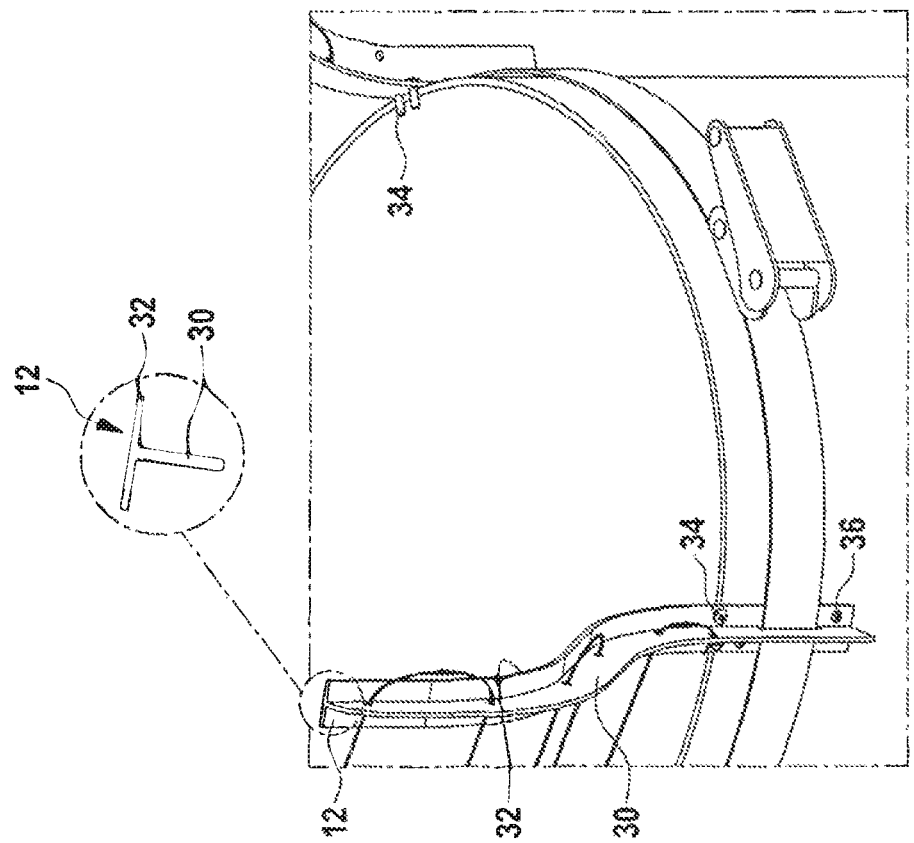
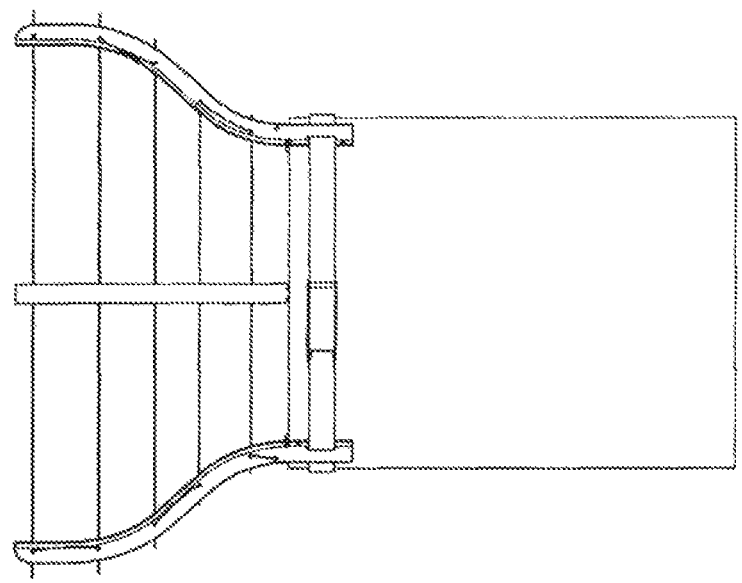
Fig. 4

DEVICE FOR COLLECTING SPLIT WOOD

CROSS-REFERENCE TO RELATED APPLICATIONS

This is a continuation application of International patent application PCT/EP2018/057491, filed on Mar. 23, 2018, which claims the priority of German patent application DE 20 2017 101 806.7, filed on Mar. 29, 2017. The entire contents of these priority applications are incorporated herein by reference.

BACKGROUND OF THE INVENTION

The present invention relates to a device for collecting split wood. When splitting wood, the log is conventionally placed on a so-called chopping block and then split with an ax. In this case, the two split pieces of wood usually fall off the side of the chopping block and onto the ground. The person chopping the wood then has to bend down to the wood to pick it up and move it away.

Bending down to the wood involves effort and is tiring.

SUMMARY OF THE INVENTION

Against this background, the object of the present invention is to provide a device which makes it easier to chop or split wood.

This object is achieved by a device for collecting split wood, which has the following features:
- a plurality of bar elements, which each have a first and a second longitudinal portion, wherein the second longitudinal portion extends in a curved manner and the first longitudinal section extends in a straight manner,
- a plurality of connecting elements, which connect the bar elements movably to one another, wherein the connecting elements cooperate with the second longitudinal portions, and
- a clamping element, which cooperates with the first longitudinal portions and is designed to firmly clamp the bar elements to a chopping block by their first longitudinal portions.

In other words, this means that the device provides a very flexibly useable collecting basket, which can be firmly clamped to the chopping block, conventionally a tree stump, in a very simple manner with the aid of the clamping element. In this case, the bar elements, in particular the second longitudinal portions of the bar elements, project upwards and form a type of collecting fence around the upper surface of the chopping block on which the wood to be split is placed.

This device prevents the split wood from falling off the side of the chopping block and onto the ground.

In a preferred further development, the bar elements are formed in an S shape. The second longitudinal portions further preferably form a collecting basket for the split wood with the connecting elements.

The curved S-shaped form of the bar elements enables a widening of the enclosed region so that the split wood can lie on the connecting elements. Therefore, the split wood does not fall back into the working region.

In a preferred further development, the bar elements—in the fastened state on the chopping block—are evenly spaced in the circumferential direction of the chopping block, wherein—in the circumferential direction—a working region is left open.

The working region consequently has an opening in the collecting basket so that the wood can be split in an unobstructed manner.

In a preferred further development, the connecting elements are formed as rope-shaped connecting elements, preferably as wire ropes.

By using wire ropes, the plurality of bar elements are movable relative to one another so that a very flexible arrangement on a chopping block is possible.

In a preferred further development, these bar elements have, in their second longitudinal portions, bores for guiding through the rope-shaped connecting elements. The first longitudinal portions further preferably each have a receiving element for guiding through the clamping element.

The connection of the connecting elements to the bar elements is therefore possible in a very simple manner. The connection of the clamping element to the bar elements is also possible in a very simple manner with the aid of the receiving element.

In a preferred further development, the clamping element is formed as a clamping belt.

Such a clamping belt is a standard component, which is very cost-effective and simple to handle.

In a preferred further development, at least two, preferably five, bar elements are provided. Further preferably, at least three, preferably five, connecting elements are provided.

In a preferred further development, at least one stop element is provided in each case on the first longitudinal portions of the bar elements, which stop element—in the fastened state on the chopping block—abuts against a working surface of the chopping block to prevent the respective bar element from slipping downwards.

At least one bore for receiving a fastening element is further preferably provided in the first longitudinal portions of the bar elements.

These measures enable very stable attachment to a chopping block.

In a preferred further development, the connecting elements are detachable from the bar elements.

These measures have the advantage that the connecting elements can be replaced at any time.

In a preferred further development, the bar elements are formed with a T-shaped cross-section.

This configuration has been shown to be particularly advantageous since the bar elements are thus very stable on the one hand and, on the other, provide space for bores through which the connecting elements and the clamping belt can be guided.

Of course, the features mentioned above and those still to be explained below can be used not only in the combination described in each case, but also in other combinations or alone, without deviating from the scope of the present invention.

BRIEF DESCRIPTION OF DRAWINGS

Further advantages and configurations of the invention are revealed in the description of the accompanying drawing, which shows:

FIG. 1 a schematic illustration of an inventive device, which is attached to a chopping block;

FIG. 2 a side view of the inventive device shown in FIG. 1;

FIG. 3 a schematic plan view of the inventive device of FIG. 1; and

FIG. 4 a schematic detailed view of a region of the inventive device.

DETAILED DESCRIPTION OF THE PREFERRED EMBODIMENTS

In FIG. 1, a device for collecting split wood, simply referred to as a collecting device below, is illustrated schematically and denoted by the reference sign 10. The collecting device 10 comprises a plurality of bar-shaped elements 12—preferably five—a plurality of connecting elements 14—preferably five—and a clamping belt 16.

The bar elements 12 are formed to all be the same and, as illustrated in FIG. 2, have a first longitudinal portion L1 and a longitudinal portion L2 adjoining this. While the first longitudinal portion L1 extends linearly, i.e. straight, the second longitudinal portion L2 has a curved form so that the bar element as a whole has an approximately S-shaped form.

The bar elements 12 have—as seen in cross-section—a T shape, as revealed in particular in the view in FIG. 4. The respective bar element 12 consequently consists of a base 30 and a flange 32.

Bores 18, through which the connecting elements 14, preferably formed as wire ropes, can pass, are provided in the base 30 in the second longitudinal portion L2.

A rectangular opening, through which the clamping belt 16 can be guided, is provided in the base 30 in the first longitudinal portion L1.

As revealed in FIG. 4, stop elements 34 are provided on the flange 32 of a bar element 12 in the first longitudinal portion L1, which stop elements project from the flange 32 in the form of pins.

Bores 36, which serve for receiving fastening elements, for example nails, are moreover provided in the first longitudinal portion L1 of a bar element 12.

The collecting device 10 can be very easily attached to a chopping block H and clamped with the clamping belt 16. The stop elements 34 are provided to prevent the individual bar elements 12 from sitting too deep, for example, with respect to a working surface A of a chopping block H, which stop elements lie on the working surface A and therefore prevent the respective bar element from slipping downwards.

The bar elements can moreover be fastened on the chopping block H by inserting fastening elements, such as nails or screws, through the bores 36.

As revealed in FIGS. 1 and 3, the bar elements 12, with the connecting elements 14, surround a large region of the circumference of the chopping block H. However, a circumferential region 24 is left open, which serves as a working opening for chopping the wood.

As is again clearly revealed in FIG. 3, the collecting device opens upwards from a diameter D1, which corresponds to the diameter of the chopping block, to a considerably larger diameter D2. This larger diameter D2 is achieved by the S-shaped configuration of the bar elements.

The bar elements are preferably made from metal and preferably protected against rust. The connecting elements are likewise preferably manufactured from metal.

The collecting device 10 makes it easier to chop wood since the split wood does not fall to the ground from the chopping block and the working surface A thereof, but is instead collected by the fence-like connecting elements 14. The user then has to simply take the wood from the working surface and no longer has to bend to the ground.

All in all, the inventive device for collecting split wood provides a considerably more comfortable manner of working, while the simple construction means that it is cost-effective and can be used very flexibly.

The invention claimed is:

1. A device for collecting split wood comprising:
   a plurality of bar elements, which each have a first and a second longitudinal portion, wherein the second longitudinal portion extends in a curved manner and the first longitudinal portion extends in a straight manner;
   a plurality of connecting elements, which connect the bar elements movably to one another, so that the bar elements are movable relative to one another, wherein the connecting elements cooperate with the second longitudinal portions to define an enclosed region; and
   a clamping element, which cooperates with the first longitudinal portions and is designed to firmly clamp the bar elements to a chopping block by their first longitudinal portions, wherein:
   the bar elements are formed in an S shape such that the enclosed region is widened:
   the connecting elements comprise wire ropes which are guided through bores in the second longitudinal portion of the bar elements and are detachable from the bar elements; and
   the clamping element is formed as a clamping belt guided through receiving elements which are provided in the first longitudinal portions of the bar elements.

2. The device as claimed in claim 1, wherein the second longitudinal portions form a collecting basket for the split wood with the connecting elements.

3. The device as claimed in claim 1, wherein the bar elements, in the fastened state on the chopping block, are evenly spaced in the circumferential direction of the chopping block, and further wherein a working region in the circumferential direction is left open.

4. The device as claimed in claim 1, wherein at least three bar elements are provided.

5. The device as claimed in claim 4, wherein five bar elements are provided.

6. The device as claimed in claim 1, wherein at least three connecting elements are provided.

7. The device as claimed in claim 6, wherein five connecting elements are provided.

8. The device as claimed in claim 1, wherein at least one stop element is provided on each side of the first longitudinal portions of the bar elements, the at least one stop element, in the fastened state on the chopping block, abutting against a working surface of the chopping block to prevent the respective bar element from slipping downwards.

9. The device as claimed in claim 1, wherein the bar elements are formed with a T-shaped cross-section.

10. A device for collecting split wood comprising:
    a plurality of bar elements configured to extend in an axial direction of the device and to be spaced apart from one another in a circumferential direction of the device;
    a plurality of connecting elements connecting the bar elements to one another and configured to extend in the circumferential direction of the device; and
    a clamping element configured to extend in the circumferential direction of the device and to clamp the bar elements to a chopping block, wherein the bar elements are movable along the connecting elements and the clamping element to adjust the spacing between the bar elements.

11. The device as claimed in claim 10, wherein the connecting elements extend through bores in the bar elements.

12. The device as claimed in claim 10, wherein the clamping element extend through openings in the bar elements.

13. The device as claimed in claim 10, wherein the connecting elements comprise wire ropes.

14. The device as claimed in claim 10, wherein the clamping element is a clamping belt.

15. A device for collecting split wood comprising:
   a plurality of bar elements;
   a plurality of connecting elements connecting the bar elements to one another; and
   a clamping element extending through openings in the bar elements and configured to clamp the bar elements to a chopping block such that:
      the bar elements extend in an axial direction of the chopping block and are spaced apart from one another in a circumferential direction of the chopping block;
      the connecting elements extend in the circumferential direction of the chopping block; and
      the clamping element extends in the circumferential direction of the chopping block.

16. The device as claimed in claim 15, wherein the connecting elements extend through bores in the bar elements.

17. The device as claimed in claim 15, wherein the bar elements are fixed relative to the clamping element when the clamping element clamps the bar elements to the chopping block, and the bar elements are movable along the connecting elements and the clamping element when the clamping element is not clamping the bar elements to the chopping block.

18. The device as claimed in claim 15, wherein when the clamping element clamps the bar elements to the chopping block, the connecting elements extend around a majority of a circumference of the chopping block without extending completely around the circumference of the chopping block to provide a working region for chopping wood.

19. The device as claimed in claim 15, wherein the connecting elements comprise wire ropes.

20. The device as claimed in claim 15, wherein the clamping element is a clamping belt.

\* \* \* \* \*

UNITED STATES PATENT AND TRADEMARK OFFICE
CERTIFICATE OF CORRECTION

PATENT NO. : 11,623,364 B2
APPLICATION NO. : 16/585262
DATED : April 11, 2023
INVENTOR(S) : Andreas Schütt It is certified that error appears in the above-identified patent and that said Letters Patent is hereby corrected as shown below:

In the Claims

At Column 4, Claim number 1, Line number 19, delete "widened:" and insert --widened;-- therefor At Column 4, Claim number 8, Line number 45, after "each", delete "side"

Signed and Sealed this
First Day of August, 2023

*Katherine Kelly Vidal*
Katherine Kelly Vidal
*Director of the United States Patent and Trademark Office*